(12) United States Patent
Dahl et al.

(10) Patent No.: US 10,913,618 B2
(45) Date of Patent: Feb. 9, 2021

(54) ADA-COMPLIANT WORKSTATION FOR PNEUMATIC TUBE DELIVERY SYSTEM

(71) Applicant: Pevco Systems International Inc., Baltimore, MD (US)

(72) Inventors: Steve Dahl, Baltimore, MD (US); Andrey Jasiukaitis, Ellicott City, MD (US); Chad Schneider, Owings Mills, MD (US); Joseph Gaultney, Baltimore, MD (US); Charles Cateora, Baltimore, MD (US)

(73) Assignee: Pevco Systems International Inc., Baltimore, MD (US)

(*) Notice: Subject to any disclaimer, the term of this patent is extended or adjusted under 35 U.S.C. 154(b) by 0 days.

(21) Appl. No.: 16/408,137

(22) Filed: May 9, 2019

(65) Prior Publication Data
US 2019/0352106 A1 Nov. 21, 2019

Related U.S. Application Data

(60) Provisional application No. 62/672,358, filed on May 16, 2018.

(51) Int. Cl.
*B65G 51/26* (2006.01)
*B65G 51/30* (2006.01)
*B65G 51/08* (2006.01)

(52) U.S. Cl.
CPC ............. *B65G 51/30* (2013.01); *B65G 51/08* (2013.01)

(58) Field of Classification Search
CPC ........ B65G 51/26; B65G 51/28; B65G 51/30; B65G 51/32; G01N 2035/0481
USPC .......... 406/31, 110, 111, 112, 176, 177, 178, 406/179, 180
See application file for complete search history.

(56) References Cited

U.S. PATENT DOCUMENTS

| | | | | |
|---|---|---|---|---|
| 3,689,009 A | * | 9/1972 | Terrell | B65G 51/30 406/110 |
| 3,790,101 A | * | 2/1974 | Weissmuller | B65G 51/26 406/105 |
| 3,948,466 A | * | 4/1976 | Rudder | B65G 51/26 406/73 |
| 3,976,264 A | * | 8/1976 | Ekama | B65G 51/04 406/112 |

(Continued)

*Primary Examiner* — Joseph A Dillon, Jr.
(74) *Attorney, Agent, or Firm* — Fay Kaplun & Marcin, LLP

(57) ABSTRACT

A workstation includes a housing and a pneumatic tube port sized and shaped to connect to tubing of a pneumatic tube delivery system. The workstation includes a carrier dispatch and arrival mechanism coupling to the pneumatic tube port and having an outlet and a slide plate movable from a position opening the outlet to a position closing the outlet. The carrier dispatch and arrival mechanism further including a dispatch arm for loading an outbound carrier for transportation from the workstation through the pneumatic tube delivery system to a further workstation. The workstation further comprises an equipment storage compartment adjacent to the carrier dispatch and arrival mechanism and a bin at the bottom of the housing sized and shaped to receive and store the inbound carriers in combination with a user interface cabinet housing a user interface apparatus and a space for supporting stored carriers.

12 Claims, 8 Drawing Sheets

(56) References Cited

U.S. PATENT DOCUMENTS

| | | | | |
|---|---|---|---|---|
| 4,059,246 A * | 11/1977 | Anders | ................... | B65G 51/04 |
| | | | | 406/31 |
| 4,256,418 A * | 3/1981 | Stangl | ....................... | H03F 3/24 |
| | | | | 406/112 |
| 4,459,069 A * | 7/1984 | Ahr | ........................ | B65G 51/32 |
| | | | | 406/74 |
| 4,661,026 A * | 4/1987 | Carlier | ................... | B65G 51/32 |
| | | | | 406/112 |
| 5,209,609 A * | 5/1993 | Lang | ...................... | B65G 51/32 |
| | | | | 406/112 |
| 5,564,868 A * | 10/1996 | Vogel | ..................... | B65G 51/34 |
| | | | | 406/112 |
| 7,686,547 B1 * | 3/2010 | Gromley | ................ | B65G 51/26 |
| | | | | 406/197 |
| 8,647,021 B2 * | 2/2014 | Valerino | ............... | B65B 51/146 |
| | | | | 406/197 |
| 9,499,354 B2 * | 11/2016 | Jones | .................... | B65G 51/42 |
| 9,902,570 B1 * | 2/2018 | Munyon | ................ | B65G 51/26 |
| 2016/0096691 A1 * | 4/2016 | Gross | .................... | B65G 51/26 |
| | | | | 406/3 |
| 2019/0183737 A1 * | 6/2019 | Valerino, Sr. | ........ | A61G 7/0506 |

* cited by examiner

B - B

US 10,913,618 B2

ADA-COMPLIANT WORKSTATION FOR PNEUMATIC TUBE DELIVERY SYSTEM

PRIORITY CLAIM

The present disclosure claims priority to U.S. Provisional Patent Application Ser. No. 62/672,358 filed May 16, 2018; the disclosure of which is incorporated herewith by reference

BACKGROUND

Many large institutions have implemented pneumatic tube systems for high-speed delivery of materials. These pneumatic systems have proven particularly useful, for example, in hospital settings as they are extremely efficient in transporting materials such as drugs, specimens and blood products, as well as small medical items. A network of tubular conduits is established throughout the facility, branching to user outlets connected to respective send/receive workstations, or portals. Items of interest may be transported between user outlets via the delivery tubes in capsule-like carriers, the contents of which are filled, for example, by users at originating outlets and emptied by users at receiving outlets. The workstations are positioned at selected locations in the institution with each workstation including an interface allowing users, including, e.g., clinicians and nurses, to direct carriers to any of the other work stations. The workstations are connected to each other via pneumatic tubing with fans ("blowers") moving the carriers through the tubes to their desired destinations via vacuum and/or positive pressure and the control of various diverters (alternately, routing devices or switches) by a central computer. The carriers are sized such that the exterior dimensions of the carrier correspond to the interior dimensions of the tubing and form a seal therebetween so that changes in pressure in the tubing propel the carriers through the tubing.

Typical workstations for pneumatic tube systems are in use 24 hours a day, every day. As such, they are difficult to keep clean. Processes, especially in hospitals, are built around the availability of the workstations, making it critical that they are reliable and easy to maintain and repair. It is not uncommon for a hospital to carry out several thousands of transports of delicate payloads in a day. The items transported include fluids that may in some cases leak from the carrier when the carrier arrives at a workstation. It is important for user safety that any spilled fluid be contained in the specific workstation in a manner that facilitates quick and effective clean-up. Systems may be used by many people, including those with various physical characteristics, limitations and handicaps.

SUMMARY

The present disclosure relates to a workstation comprising a housing having a top, a rear, a bottom and two sides bounding an interior of the workstation and a pneumatic tube port extending into the housing sized and shaped to connect to tubing of a pneumatic tube delivery system exterior to the workstation in combination with a carrier dispatch and arrival mechanism including an input/output (I/O) tube sized and shaped to couple to the pneumatic tube port and having an outlet and a slide plate movable from a first position allowing access between the opening and the I/O tube to a second position closing the opening, the carrier dispatch and arrival mechanism further comprising a dispatch arm for loading an outbound carrier for transportation from the workstation through the pneumatic tube delivery system to a further workstation and a slide mechanism configured to slide the dispatch arm from a forward position, where the outbound carrier is loaded, to a rear position, where the dispatch arm is coupled to the I/O tube and the slide plate is in the first position for introducing the outbound carrier through the opening into the tubing of the pneumatic tube delivery system, wherein, when the dispatch arm is in the forward position and the slide plate is in the first position, inbound carriers move through the opening into the interior of the workstation. The workstation further comprises an equipment storage compartment adjacent to the carrier dispatch and arrival mechanism and a bin at the bottom of the housing sized and shaped to receive and store the inbound carriers in combination with a user interface cabinet housing a user interface apparatus, the user interface cabinet being located above the bin and below the equipment storage compartment, wherein a space between a bottom surface of the equipment storage compartment and an upper surface of the user interface cabinet defines a space for supporting stored carriers.

The present disclosure also relates to a workstation, comprising a first sensor configured to detect presence of a carrier at a predetermined location at the workstation, the carrier being delivered to the workstation via a pneumatic tube delivery system and a second sensor configured to detect presence of the carrier in an area surrounding the workstation in combination with circuitry connecting the first and second sensors with a central processor for the pneumatic tube delivery system, wherein, when the first sensor detects the presence of the carrier at the predetermined location, the central processor determines the carrier is at the workstation, and wherein, when the first sensor detects an absence of the presence of the carrier at the predetermined location and the second sensor detects the presence of the carrier in the area surrounding the workstation, the central processor determines the carrier remains in the area surrounding the workstation, and wherein, when the second sensor detects an absence of the presence of the carrier in the area surrounding the workstation, the central processor determines the carrier is no longer at the workstation.

The present disclosure also relates to a method comprising receiving a carrier at a predetermined location at a workstation via a pneumatic tube delivery system and detecting at a first sensor a presence of the carrier at the predetermined location in combination with determining, based on the detected presence of the carrier at the predetermined location, the carrier is at the workstation and detecting at the first sensor an absence of the presence of the carrier at the predetermined location. The method further comprise detecting at a second sensor a presence of the carrier in an area surrounding the workstation and determining, based on the detected absence of the presence of the carrier at the predetermined location and the detected presence of the carrier in the area surrounding the workstation, the carrier remains at the workstation in combination with detecting at the second sensor an absence of the presence of the carrier in the area surrounding the workstation and determining, based on the detected absence of the presence of the carrier in the area surrounding the workstation, the carrier is no longer at the workstation.

BRIEF DESCRIPTION

DETAILED DESCRIPTION

Figure 1:
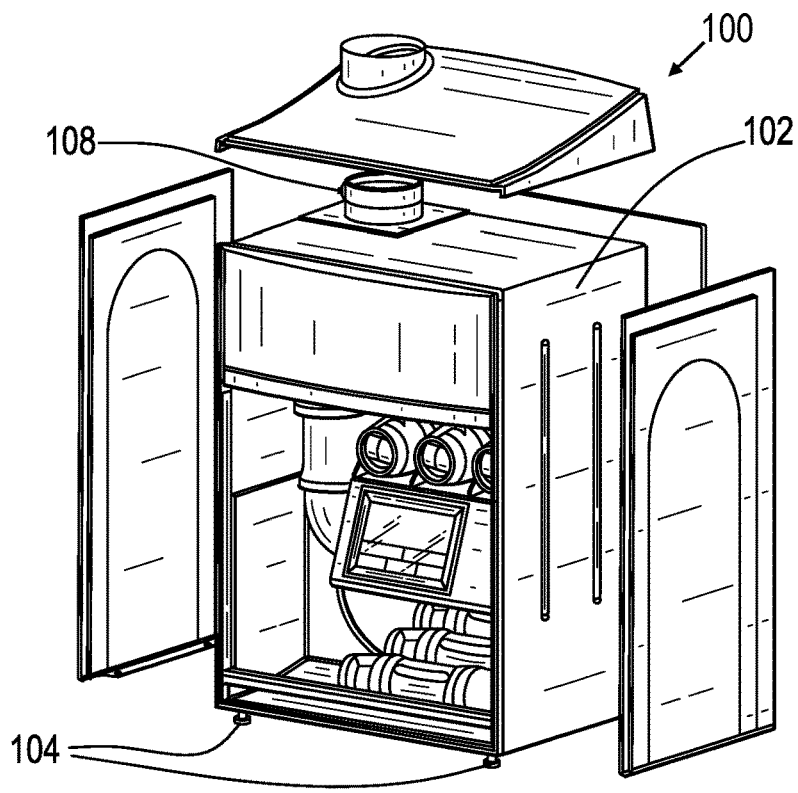
FIG. 1 shows a perspective view of a workstation for integration into a pneumatic tube delivery system according to an exemplary embodiment of the present disclosure.

The present disclosure may be further understood with reference to the following description and the appended drawings, wherein like elements are referred to with the same reference numerals. The present disclosure is directed to a workstation for integration into a pneumatic tube delivery system. The workstation has modular components facilitating repair and cleaning. The workstation is also more easily accessible for a wider range of people, including people with various disabilities, and may be made compliant with ADA (Americans with Disabilities Act) guidelines while remaining easy to access by a wide range of able-bodied personnel due to its compact arrangement of components. Specifically, ADA guidelines concerning forward reach generally set a maximum height of 48" for equipment, device controls and interfaces that are regularly accessed by users. In hospitals, much of the equipment used by nurses and other users is not ADA compliant.

Figure 2:
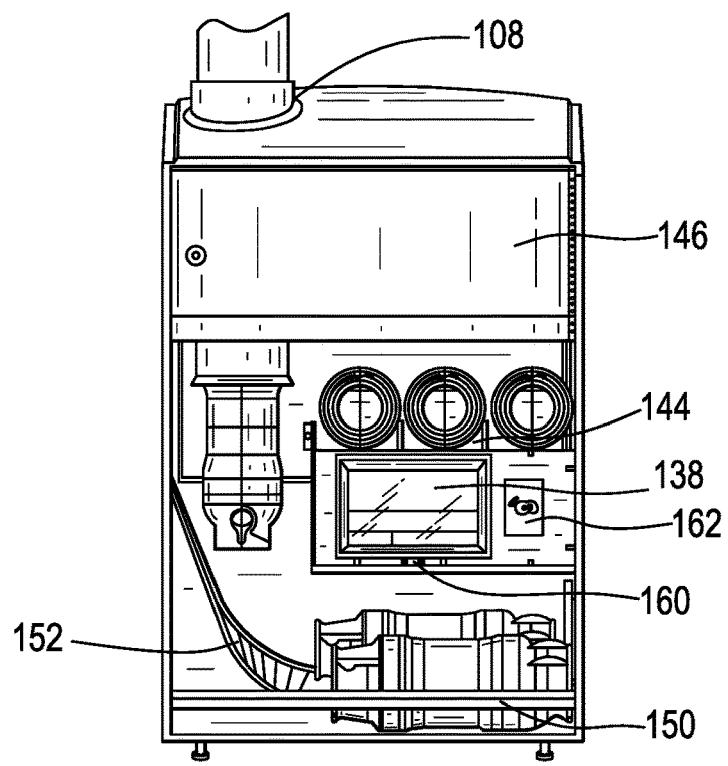
FIG. 2 shows a front view of the workstation of FIG. 1.
Figure 3:
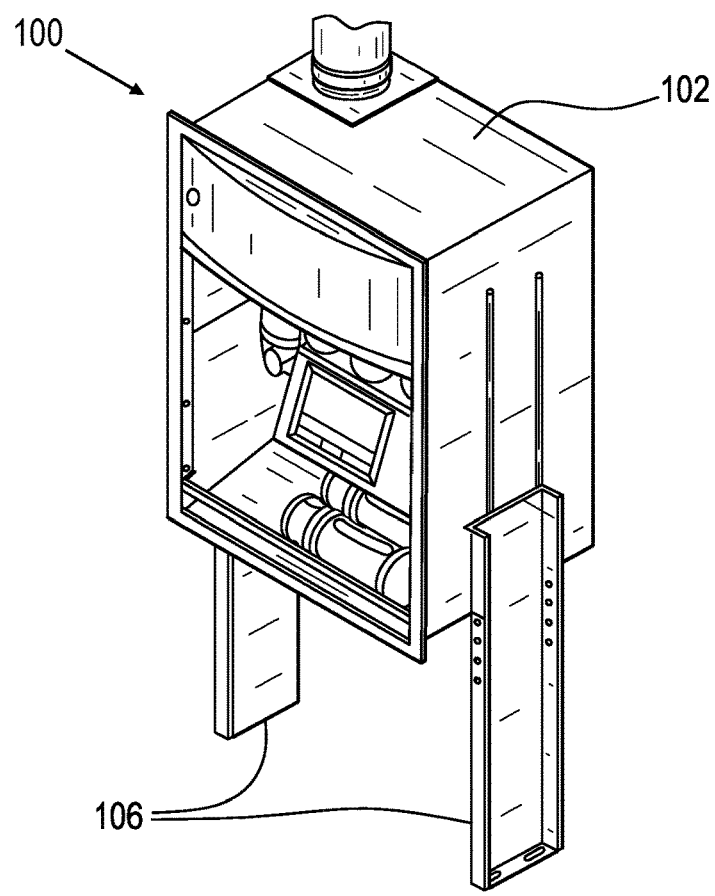
FIG. 3 shows a perspective view of the workstation of FIG. 1 mounted on support structure.
Figure 4:
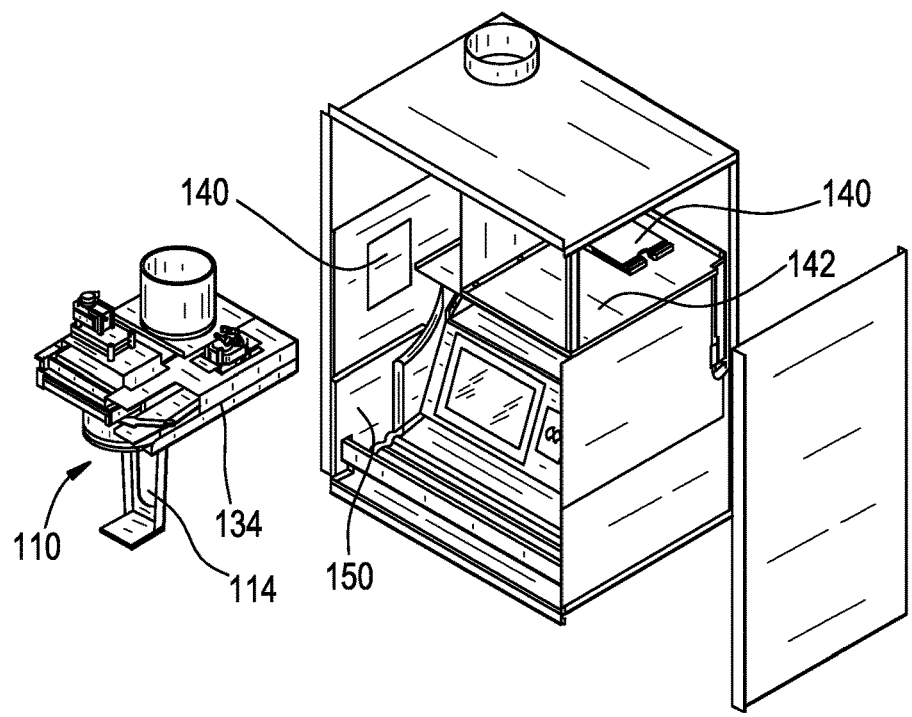
FIG. 4 shows a perspective view of the workstation of FIG. 1 with a modular carrier dispatch and arrival mechanism withdrawn from the housing.
Figure 5:
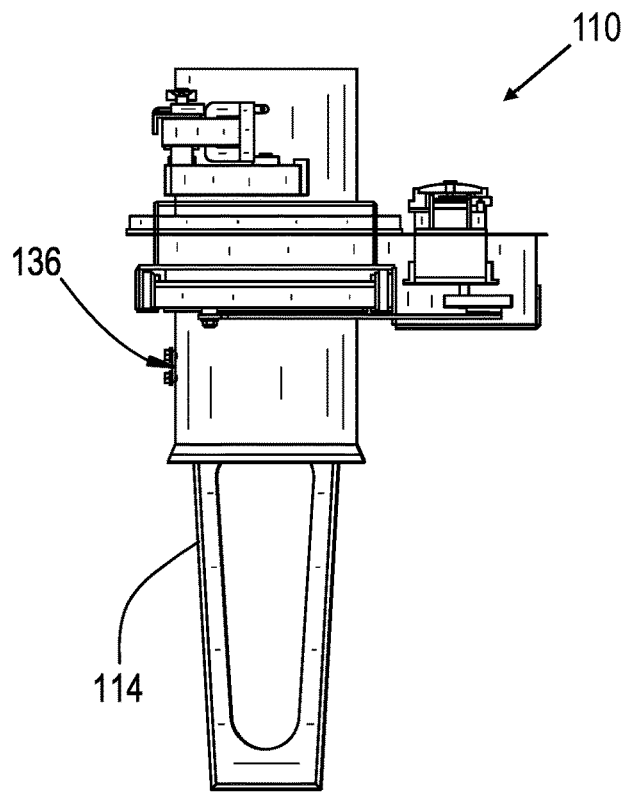
FIG. 5 shows a side view of the carrier dispatch and arrival mechanism of FIG. 4.
Figure 6:
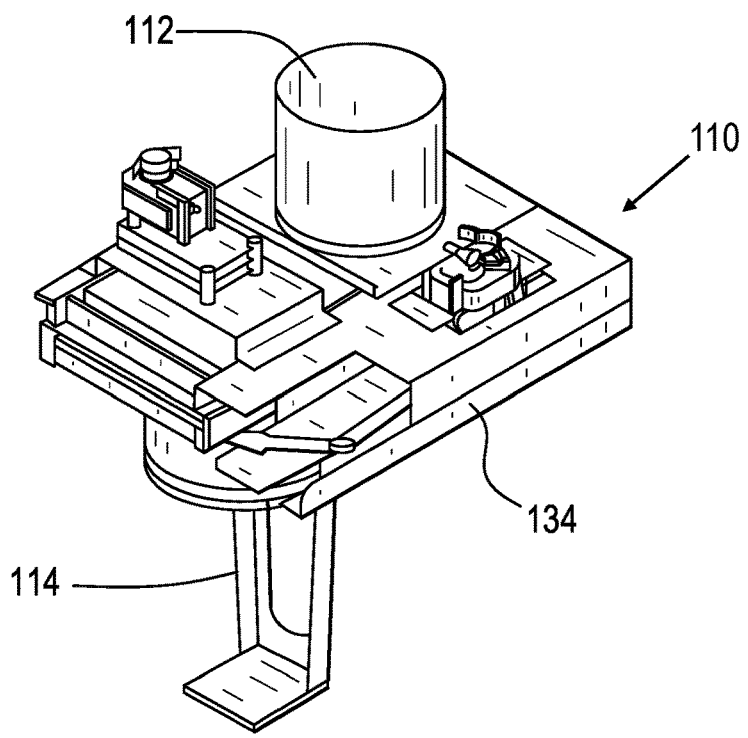
FIG. 6 shows a perspective view of the carrier dispatch and arrival mechanism of FIG. 4.

The workstation 100 has a housing 102, including a top, a bottom, two sides and a rear, with an open front. As would be understood by those skilled in the art, the housing 102 may be forming of any suitable materials keeping in mind the required strength, cleanability, etc. For example, the housing 102 may be galvanized steel (for e.g. structural components) or stainless steel (for e.g. visible components). The workstation 100 may be fitted with, in one embodiment, four feet 104 extending from the bottom of the housing 102, as seen in FIGS. 1-2. In another embodiment two legs 106 are attached to the sides of the housing 102, as seen in FIG. 3. The feet 104 may be used when the workstation 100 is installed on, e.g., a counter top, while the legs 106 may be used when the workstation 100 is mounted to, e.g., a floor or a wall. The legs 106 may be, e.g., slats or U-channels bored at a series of distances along the length of the leg 106 for attachment via screws or other suitable fasteners to correspondingly-sized bores on the sides the housing 102. The workstation 100 is mountable at a series of heights to position the components at a desired height from the ground, including at a height which permits the workstation 100 to meet ADA forward reach guidelines. A pneumatic tube port 108 extends from the top of the housing 102 and is sized to connect to the pneumatic tubing of the system that may, for example, have a diameter of 4" or 6". The pneumatic tube port 108 is a modular component which may be easily removed and replaced as a unit with a port sized to match the existing tubing, for example, 4" or 6" pneumatic tubing, so that the workstation 100 may be employed in a system with any size of tubing. Of course, those skilled in the art will recognize that other systems employing other tubing sizes may be similarly accommodated by the present embodiments.

Figure 7:
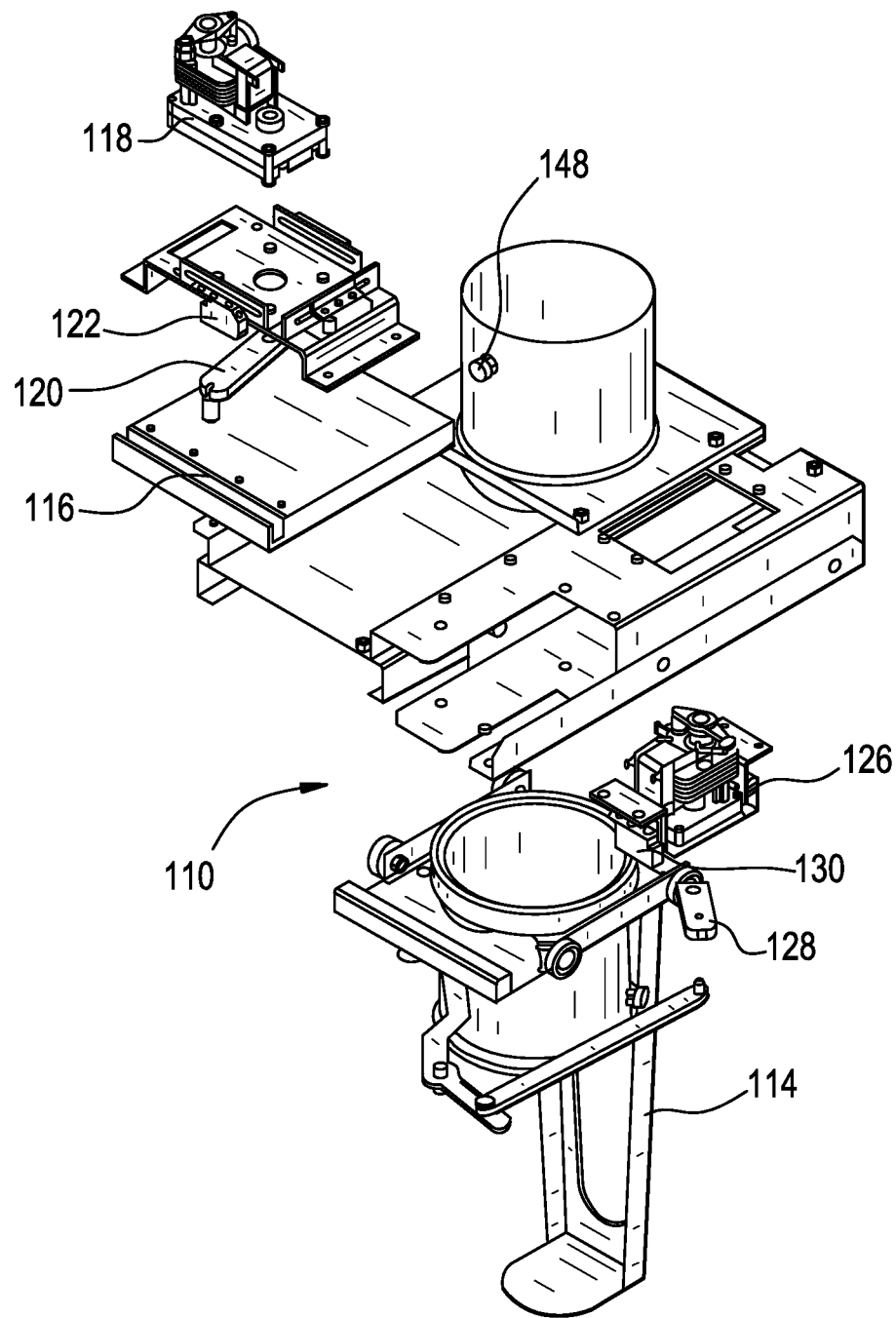
FIG. 7 shows an exploded view of a carrier dispatch and arrival mechanism according to a first exemplary embodiment.
Figure 8:
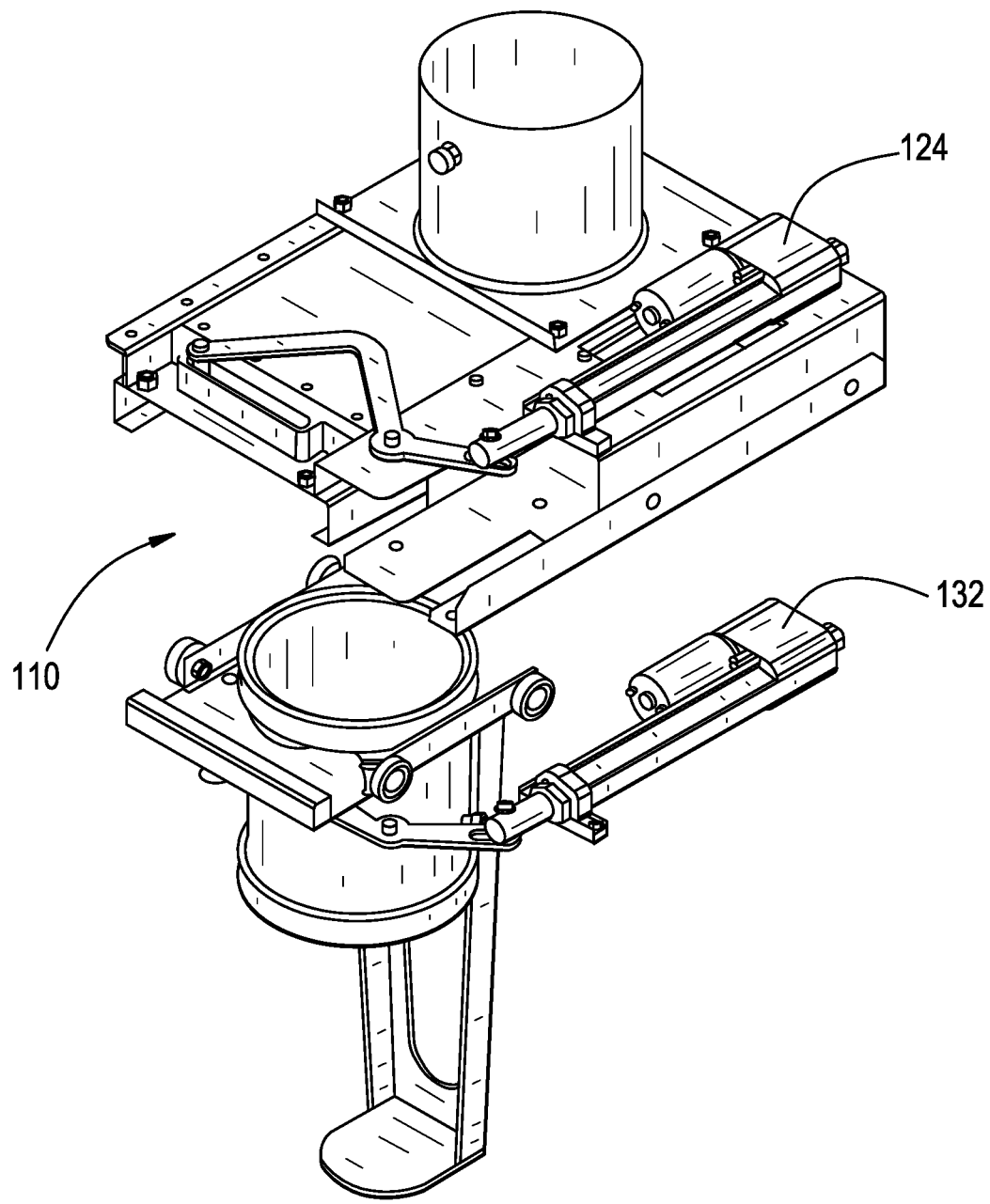
FIG. 8 shows an exploded view of a carrier dispatch and arrival mechanism according to a second exemplary embodiment.

As shown in FIGS. 3-8, a modular carrier dispatch and arrival mechanism 110 includes an input/output (I/O) tube connection 112 with an open top side and bottom side. The I/O connection 112 is configured to couple to the pneumatic tube port 108 on the top side. The bottom side of the mechanism 110 is, in this embodiment, covered by a retractable slide plate 116 and couples to a dispatch arm 114 when the slide plate 116 is retracted and opens directly to the interior of the workstation 100 when the slide plate 116 is retracted. The slide plate 116, as shown in FIGS. 7-8 is slidable between a first position allowing access to the I/O connection 112 from below and a second position in which the slide plate 116 covers the bottom side of the I/O connection 112 preventing access thereto. The second (closed) position is, in this embodiment, the default position. When the slide plate 116 covers the I/O connection 112 it provides a seal so that, when a carrier arrives, an air cushion is created between the arriving carrier and the workstation 100. The cushion slows the arriving carrier, protecting both the carrier and its contents and reducing the sound generated when the carrier hits the slide plate 116. The slide plate 116 of this embodiment includes a dense foam cushion/spring that helps create the desired air seal. The slide plate 116 is movable by a sliding mechanism including, in a first embodiment, a slide plate motor 118, a slide plate cam 120 and an optional slide plate sensor 122, as shown in FIG. 7. The motor 118 in this embodiment is an electric motor (AC or DC) driving the cam 120 to advance or retract the slide plate 116. The optional sensor 122 enables the system to determine a position of the slide plate 116. In an alternate embodiment, a limit switch is used to determine the position. In a further embodiment, the slide plate sliding mechanism includes a linear actuator 124 in lieu of the motor 118, as shown in FIG. 8. In this embodiment the sensor 122 or switch may not be necessary.

The slide plate 116 is moved to the first position (i.e., opening the bottom side of the I/O connection 112) when, for example, an inbound carrier is received or when an outbound carrier is to be sent away from the workstation 100. The dispatch and arrival mechanism 110 includes a dispatch arm 114 for loading carriers for delivery to other workstations. The dispatch arm 114 has a tubular portion (i.e., dispatch sleeve) into which the top of the outbound carrier is inserted and a holder portion (i.e., a dispatch foot) supporting the bottom of the outbound carrier. Carriers are typically designed to form a seal with the tubing they are to travel within. This seal is formed between the outbound carrier and the tubular portion of the outbound holder 114 when the carrier is inserted therein. The carrier dispatch arm 114 is movable from a first position, i.e., a forward position, in which it receives the outbound carriers from operating personnel, to a second position, i.e., a rear position, in which the tubular portion is aligned with the I/O connection 112, such that an imposition of a vacuum on the connected portion of tubing draws the outbound carrier into the system, as would be understood by those skilled in the art. The dispatch arm 114 is movable by a slide mechanism similar to the slide plate slide mechanism. The dispatch slide mechanism includes, in a first embodiment, a dispatch motor 126, a dispatch cam 128 and an optional dispatch sensor 130, as shown in FIG. 7. The motor 126 may be an electric motor (AC or DC) driving the cam 128 to advance or retract the dispatch arm 114. The optional sensor is used to determine a position of the dispatch arm 114. In an alternate embodiment, a limit switch is used to determine the position. In a further embodiment, the dispatch sliding mechanism includes a linear actuator 132 in lieu of the motor 126, as shown in FIG. 8. In this embodiment the sensor 130 or switch may not be necessary.

When the dispatch arm 114 is in the forward position the I/O connection 112 is typically closed by the slide plate 116, as that is the default position. When the dispatch arm 114 is holding a carrier pre-dispatch it may be moved into alignment with the I/O connection 112 when a route to its destination becomes available. At that time, the slide plate 116 moves to the open position and the dispatch arm 114 moves to the rear position. The tubular portion of the dispatch arm 114 in this embodiment has a sensor 136 detecting a color on, for example, a part or label of the carrier with the color of the label indicating a desired variable such as a home station for the carrier, a priority level of the carrier contents, etc. The color detecting sensor 136 has been previously described in, e.g., U.S. Pat. No. 8,825,203 the entire disclosure of which is hereby incorporated by reference into this application.

The workstation 100 of this embodiment also includes three additional sensors. A first sensor 148 is disposed on or adjacent to the I/O connection 112 and detects the arrival of a carrier has arrived at the workstation 100 as the carrier is sitting on top of the slide plate 116. A second sensor (not pictured) detects a carrier positioned on the dispatch arm 114 and a third sensor (not pictured) detects any carrier that is blocking movement of the dispatch arm 114 into the rear position, i.e., when the workstation bin 150 (to be described in further detail below) is full. These three additional sensors may be, e.g., optical sensors. The workstation 100 includes a computer in communication with the central computer of the pneumatic system. The computer includes a user interface 138 with, in this embodiment, a touchscreen for, e.g., documenting, addressing and sending carriers and displaying historical information on arrivals and departures. The touchscreen of this embodiment also allows users to send away excess empty carriers or to call for empty carriers when the carrier inventory for the workstation 100 is low. The workstation further includes a barcode scanner 160 for scanning a barcode and determining, e.g., the contents of a carrier, and an RFID proximity badge reader 162 for short-range, e.g., ½ inch, scanning of carriers for identification purposes.

Each carrier is typically equipped with an RFID tag which may, for example, be a passive RFID tag. The RFID tags of the carriers communicate preprogrammed information such as, for example, the carrier ID number and color (or the associated data represented by the color), etc. A separate database may be used to link the ID number to additional data such as a carrier date of manufacture, date shipped, purchasing hospital, etc. The system control software may rely on the RFID tag to identify information such as an originating workstation from which the carrier was received, contents of the carrier when it arrived, a priority level for delivery of the contents, a home workstation to which the carrier is to be returned, etc. Alternately, other means may be used for deriving this information, as would be understood by those skilled in the art. The exemplary workstation 100 shown in FIG. 1 has two RFID antennas 140 receiving transmissions from all carriers within range of the RFID antennas 140. However, the workstation 100 may have more or less RFID antennas, as would be understood by those skilled in the art. The range of the antennas 140 is preferably selected to detect all carriers in the immediate vicinity of the workstation 100 without overlapping with the coverage area of the antennas 140 of other workstations 100. In this manner, the system will be able to identify at all times the carriers located at each of the workstations 100 and will know when any carrier leaves any workstation 100 either via the pneumatic tubing or by, for example, being carried away by an employee. That is, as a carrier travels away from a workstation 100, the system will detect its change in status from present at the workstation 100 to absent when the carrier moved beyond the range of the antennas 140 whether the carrier has been shipped out via the system to another workstation 100 or walked away by an employee.

Maintaining accurate carrier inventories is critical to the proper operation of a pneumatic tubing system. In fact, this arrangement for the first time allows the monitoring of carriers that are carried away from workstations 100 and will then pick up the location of any such carrier when, at any time, it is brought within the range of the antennas 140 of any of the workstations 100. The antennas 140 of this embodiment send this information to the control software for the pneumatic tubing system, which tracks the locations of all of the carriers in this way. In contrast, prior systems generally registered carriers via RFID through short range RFID detection methods only when these carriers were inserted back into or withdrawn from the pneumatic tubing at the workstation 100. For example, some prior systems detect the RFID of a carrier only when it arrives at a workstation 100 (i.e., as it rests on the slide plate 116 before retrieval) or as it is loaded into the tubing via the dispatch arm 114. The locations of carriers stored near these prior workstations or that were manually carried away from these prior workstations are not known by the system. Although there is RFID tracking only when a carrier is in the vicinity of one of the workstations 100, the present system may supplement this with optical sensors throughout the tubing (e.g., at diverters) that detect carriers as the carriers progress through the tubing.

The user interface 138 may be utilized to enter delivery parameters and related information directing that a particular carrier be sent from the current workstation 100 to a destination workstation 100. In one embodiment, the outgoing carrier is loaded into the dispatch arm 114 and introduced into the pneumatic system via a command at the user interface 138. The dispatch arm 114 moves to the rear position via the sliding mechanism, and the carrier is drawn into the system by a vacuum initiated by central computer control of blowers of the system. Before the outgoing carrier moves through the tubing away from the workstation 100, it may be identified via the RFID antennas 140 and the user may double check to ensure that the indicated carrier ID matches the carrier being loaded. Then, as the carrier travels away from the workstation 100 via the tubing, the antennas 140 register the fact that this carrier is no longer at the sending workstation 100. At this point the system 100 may alert the destination workstation 100 to expect the arrival of this carrier and request notification when the carrier arrives at the destination workstation 100. In addition, all carriers may be monitored in transit as they move through the tubing into and out of the range of the antennas 140 of the workstations 100 they pass on the way to their destination workstations 100 or as they pass optical sensors, etc. This allows the system to, for example, monitor the paths traveled by the carriers and obtain data that may be used to optimize carrier paths and/or transit times over time.

The dispatch and arrival mechanism 110 is manually slidable into and out of the housing 102 via sliders 134 on the sides of the dispatch and arrival mechanism 110 and corresponding slider receivers built into the housing 102. The sliders 134 and the slider receivers are arranged so that the top of the I/O connection 112 lines up with the bottom of the pneumatic tube port 108 when the dispatch and arrival mechanism 110 is slid fully into the housing 102. The I/O connection 112 and the tube port 108 are sealed together with, e.g., a hose-clamp style fastener along with a rubber gasket. The dispatch and arrival mechanism 110 is held in the housing 102 with e.g. two mechanical fasteners. Thus, it may be seen that the entire assembly may be easily and quickly removed for service or replacement. Hospital processes are designed around the availability of the pneumatic tubing system. The workstation 100 supports hospital processes continuously throughout the day, making quick maintenance of workstation components, whether planned or emergency, essential so as not to disrupt these processes for very long.

Adjacent to the installed dispatch and arrival mechanism 110 is an equipment compartment 142 storing electronic equipment, such as circuit boards, the power supply and fuses for the workstation 100, circuitry, controllers, ethernet ports, etc. In this embodiment, an equipment access door 146 extends across the front of the workstation 100 to enclose the dispatch and arrival mechanism 110 (with the exception of the dispatch arm 114) and the equipment compartment 142 behind the door 146 within the housing 102. The equipment access door 146 may be locked to prevent access by unauthorized personnel.

Figure 9:
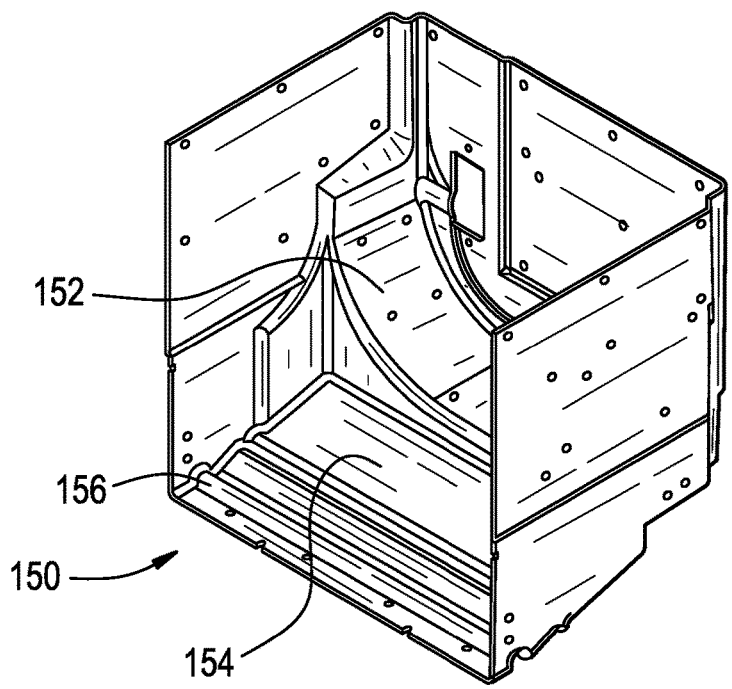
FIG. 9 shows a perspective view of a seamless bin of the workstation of FIG. 1.
Figure 10:
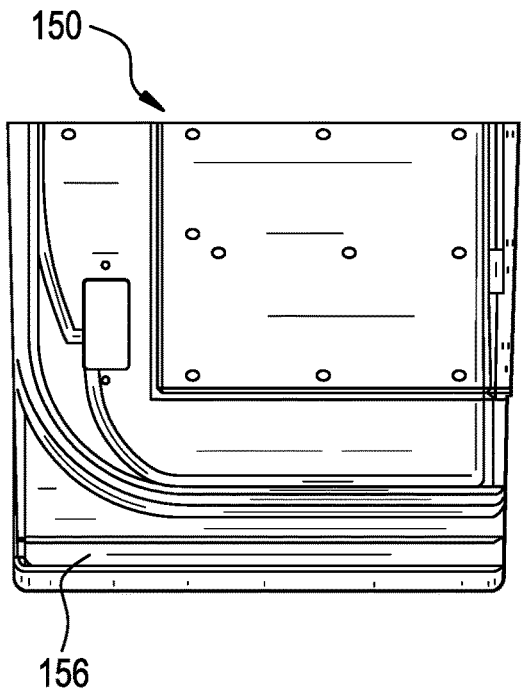
FIG. 10 shows a front view of the seamless bin of the workstation of FIG. 1.
Figure 11:
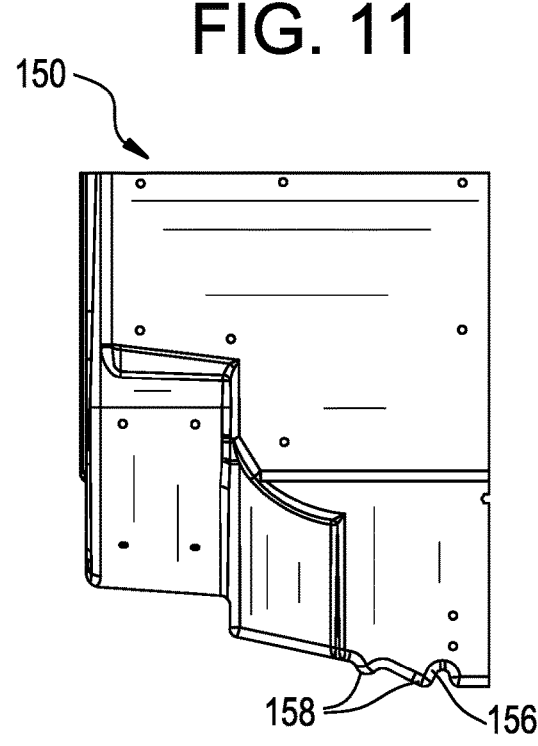
FIG. 11 shows a side view of the seamless bin of the workstation of FIG. 1.

The workstation 100 includes a seamless bin 150 for receiving and storing inbound carriers. The bin 150 may be made of, e.g., plastic, such as Kydex. As shown in FIGS. 9-11, the bin 150 includes a ramp 152 positioned beneath the I/O connection 112 on which inbound carriers are received. The ramp 152 orients the carriers and guides them to an area 154 for storage of delivered carriers. The ramp 152 has a first end attached to the side of the housing 102 adjacent to the dispatch and arrival mechanism 110 that slopes downward toward the opposite side of the workstation 100 until it approaches the delivered carrier storage area 154, where the ramp 152 curves so that it extends to the opposite side while sloping downward toward the front of the bin 150, as shown in, e.g., FIGS. 9 and 12. When a carrier is received on the ramp 152 it is oriented to roll toward the front of the bin 150 until it comes to rest at a lip 156 at the front of the bin 150 (or toward the front of the bin 150 against a carrier that arrived previously), as may be seen in FIG. 12. A plurality of arrived carriers may be stored in the bin 150 awaiting retrieval by personnel. The bin 150 may hold, e.g., three carriers in the storage area 154. If, in this example, a fourth carrier arrives, it may not drop fully into the storage area and may block the dispatch arm 114 from moving into the rear position. In such a situation, a sensor detects the obstruction and, in this embodiment, notifies a user via the user interface 138. The bin 150 of this embodiment is formed as a single piece so that spills resulting from, for example, by unsealed or poorly sealed carriers, are contained. The bin 150 has fluid retention areas 158 for collecting spilled fluids and facilitating cleaning of the bin 150, if necessary. The single piece construction of the bin 150 prevents spilled fluids from dripping onto the floor or contaminating the workstation structure and allows for ease of replacement, if necessary. The bin 150 may also include wire management channels as would be understood by those skilled in the art.

An area for carrier storage 144 extends from the back of the housing 102 into the interior of the housing 102 below the equipment compartment 142 and above the bin 150. The carrier storage 144 in this embodiment has a storage portion sized to hold up to three empty carriers oriented lengthwise from the back toward the front of the housing 102, as shown in, e.g., FIGS. 1-2, 12 and 13, although those skilled in the art will understand that the width of the area may be modified to hold any desired number of carriers in any suitable orientation without departing from the disclosed embodiments. The carrier storage area 144 of this embodiment includes separators to prevent the stored carriers from rolling off of the top of the area 144 and to allow RF signals to travel unimpeded. The carrier storage 144 has an overhang portion 170 angled down with a front face angled slightly forward where the user interface 138, barcode scanner 160 and RFID proximity badge reader 162 are located.

The aforementioned arrangement of workstation components is ergonomically designed to be compact and accessible, allowing for ease of use by personnel. The components routinely used/manipulated by personnel on a day-to-day basis are the dispatch arm 114 (for loading outbound carriers), carriers received at the workstation 100 and dropped in the bin 150, carriers emptied and awaiting use to carry material away from the workstation 100 resting in the carrier storage 144, and the touch screen user interface 138. The geometric arrangement of the above-mentioned components is specifically designed to permit all of these regularly manipulated components to remain below the 48" maximum height. For example, in the workstation 100 according to the embodiment shown in FIG. 8, the lower half of each of the carriers in the carrier storage 144 is at or below 48" from the ground. As these stored carriers are the highest of the regularly manipulated components of the workstation 100, the workstation 100 complies with current ADA guidelines.

The following features of the design facilitate the aforementioned accessibility and ADA compliance. The features will be described with respect to the geometric arrangement of the manipulable components (the dispatch arm 114, the carriers in bin 150, the carriers in the carrier storage 144 and the user interface 138) in the front-facing plane of the workstation 100. First, it is noted that for grabbable items, e.g. carriers, the 48" requirement applies to a midline of the item. In other words, half of the carrier may be above the 48" limit so long as the other half is at or below the 48" limit. Thus, the disposition of the carrier storage 144 at the top of the geometric arrangement provides space savings of half of the carrier diameter. The user interface 138 is disposed below the carrier storage 144, allowing for ease of viewing by disabled personnel while the stored carriers above the user interface 138 remain within reach for the personnel. The dispatch arm 114 is located to the side of the carrier storage 144 and the user interface 138, allowing for ease of loading by personnel. The carriers are loaded into the dispatch arm 114 in a vertical position, and the midpoint of the vertical carrier is located below the 48" limit. Thus, the carrier loading feature of the workstation 100 is also in accordance with ADA regulations.

The remainder of the modular dispatch and arrival mechanism 110 and the equipment compartment 142 is above the 48" limit. However, these portions of the workstation 100 do not require day-to-day manipulation by personnel and thus do not fall within the relevant ADA guidelines. For example, these components will need to be accessed only as malfunctions occur or at any other time at which it is desired to replace the modular dispatch and arrival mechanism 110 by sliding it out of the housing 102 via the sliders 134. Similarly, malfunctions may occur with the equipment in the equipment compartment 142 that require attention from personnel. However, these occurrences are not frequent, and ADA design guidelines are intended for those who regularly use a product, not those who service it.

In the embodiment of the workstation 100 shown in FIG. 8, the difference between the minimum height of manipulable objects (midpoint of carriers in bin 150) and maximum height of manipulable objects (midpoint of carriers in carrier storage 144) is merely 18.7". This compact arrangement of manipulable items allows for ease of accessibility by all personnel. When the workstation 100 is mounted on the legs 106 such that the maximum height is 48", the minimum height is 29.3". Thus, for able-bodied personnel of ~6' in height, the lowest carriers would require the personnel to bend over only slightly to grab them.

Figure 12:
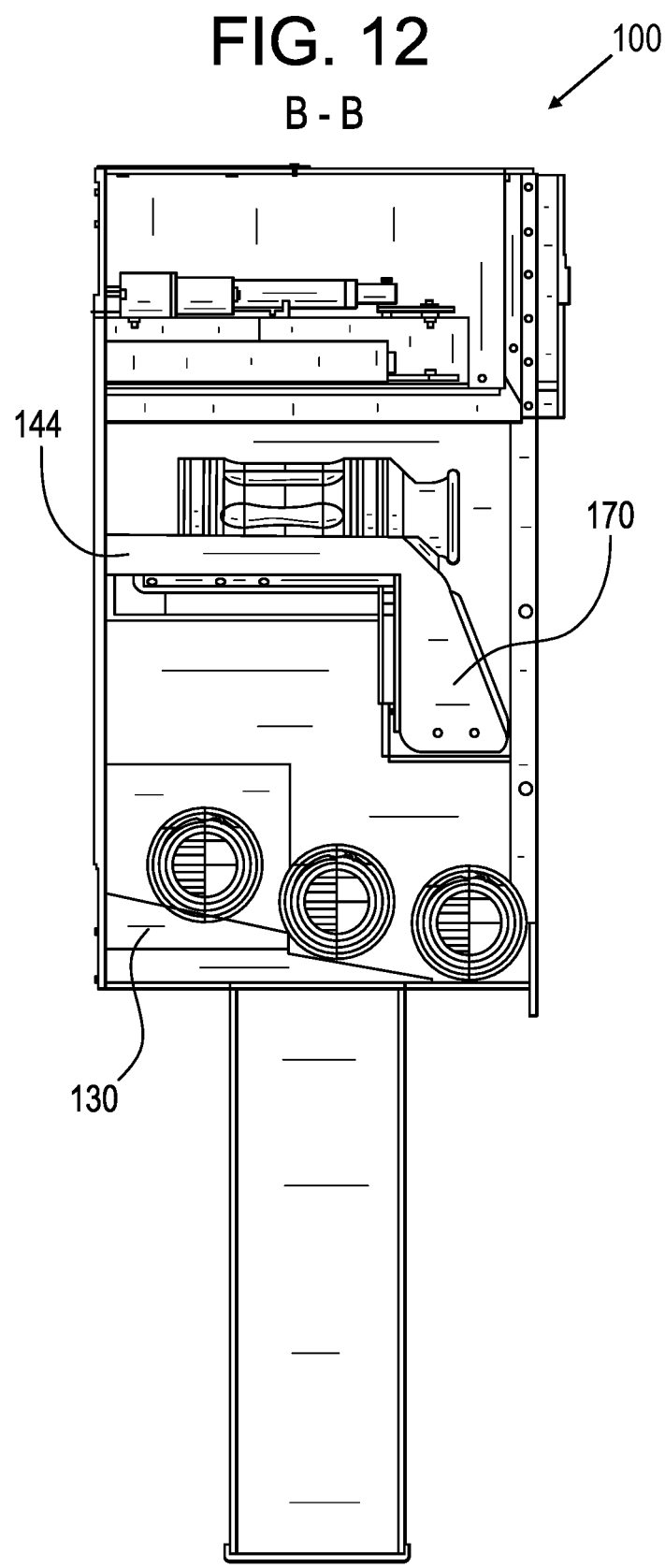
FIG. 12 shows a cutout side view of the workstation including support structure of FIG. 3.
Figure 13:
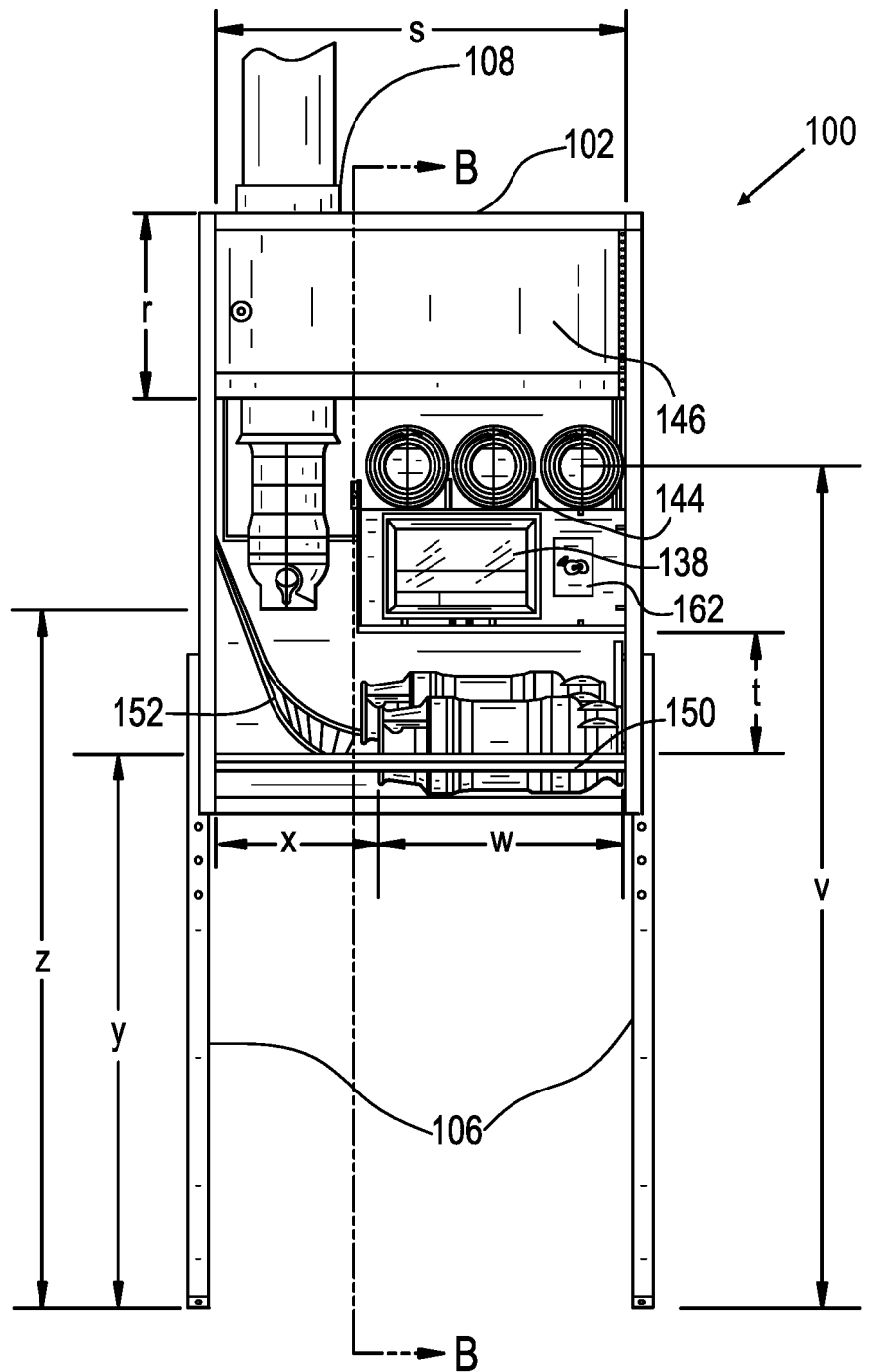
FIG. 13 shows a front view of the workstation of FIG. 3 with exemplary dimensions.

FIG. 13 shows a front view of the workstation 100 having a cross-section cut B-B along with exemplary dimensions r, s, t, v, w, x, y and z. The cross-section cut B-B is shown in FIG. 12. The exemplary dimensions are used to further describe the workstation 100. In the exemplary embodiment, the dimension r refers to a height of the door 146 and may be approximately 11.25". Further, the dimension s may be approximately 26.37" and the dimension t may be approximately 7.80". The dimension w may be approximately 17.12" and the dimension x may be approximately 9.25". The dimensions s, x and w may be different from those in the exemplary embodiment, however the dimensions x and w combined must be substantially equal to the dimension s. The dimension v refers to a maximum height of the lower half of each of the carriers in the carrier storage 144 and may not be greater than 48.00" from the ground to be in compliance with current ADA guidelines. The dimension y refers to a minimum height of the lower half of each of the carriers in the carrier storage 144 and may not be less than 29.30" from the ground to be in compliance with current ADA guidelines. The dimension z refers to a height of the bottom of the dispatch arm 114 and must be below the maximum height mentioned above, for example, the dimension z may be approximately 38.88" as in the exemplary embodiment. The dimensions r, s, t, v, w, x, y, z may be different from those described above as long as the workstation 100 is in compliance with current ADA guidelines.

The invention claimed is:

1. A workstation, comprising:
a housing having a top, a rear, a bottom and two sides bounding an interior of the workstation;
a pneumatic tube port extending into the housing sized and shaped to connect to tubing of a pneumatic tube delivery system exterior to the workstation;
a carrier dispatch and arrival mechanism including:
an input/output (I/O) tube sized and shaped to couple to the pneumatic tube port and having an outlet;
a slide plate movable from a first position allowing access between the opening and the I/O tube to a second position closing the opening;
a dispatch arm for loading an outbound carrier for transportation from the workstation through the pneumatic tube delivery system to a further workstation; and
a slide mechanism configured to slide the dispatch arm from a forward position, where the outbound carrier is loaded, to a rear position, where the dispatch arm is coupled to the I/O tube and the slide plate is in the first position for introducing the outbound carrier through the opening into the tubing of the pneumatic tube delivery system, wherein, when the dispatch arm is in the forward position and the slide plate is in the first position, inbound carriers move through the opening into the interior of the workstation;
an equipment storage compartment adjacent to the carrier dispatch and arrival mechanism;
a bin at the bottom of the housing sized and shaped to receive and store the inbound carriers; and
a user interface cabinet housing a user interface apparatus, the user interface cabinet being located above the bin and below the equipment storage compartment, wherein a space between a bottom surface of the equipment storage compartment and an upper surface of the user interface cabinet defines a space for supporting stored carriers.

2. The workstation of claim 1, wherein the bin is seamless for fluid retention.

3. The workstation of claim 2, wherein the bin has a ramp for supporting the inbound carriers and orienting the inbound carriers in an area for delivered carriers.

4. The workstation of claim 3, wherein the ramp is curved to direct the inbound carriers toward the front of the workstation.

5. The workstation of claim 4, wherein the bin includes fluid retention areas for collecting fluids introduced into the workstation.

6. The workstation of claim 5, wherein the ramp and bin are molded as a single piece.

7. The workstation of claim 1, wherein the dispatch arm, the bin, the user interface cabinet and the space for supporting stored carriers are ADA-compliant for forward reach.

8. The workstation of claim 1, further comprising feet for supporting the workstation.

9. The workstation of claim 1, further comprising legs for mounting the workstation.

10. The workstation of claim 1, wherein the carrier dispatch and arrival mechanism is movable into and out of the housing on slider rails.

11. The workstation of claim 8, wherein, when the carrier dispatch and arrival mechanism is inserted into the housing, the I/O tube and the pneumatic tube port are sealed together with a fastener.

12. The workstation of claim 9, wherein, when the carrier dispatch and arrival mechanism is inserted into the housing, the carrier dispatch and arrival mechanism is secured to the housing with at least one fastener.

* * * * *

UNITED STATES PATENT AND TRADEMARK OFFICE
CERTIFICATE OF CORRECTION

PATENT NO. : 10,913,618 B2
APPLICATION NO. : 16/408137
DATED : February 9, 2021
INVENTOR(S) : Dahl et al.

Page 1 of 1

It is certified that error appears in the above-identified patent and that said Letters Patent is hereby corrected as shown below:

On the Title Page

Inventor 1 "Steve Dahl, Baltimore, MD (US);" should be "Steven M. Dahl, Baltimore, MD (US);"

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*